Jan. 10, 1939.　　　W. V. THELANDER　　　2,143,040
CLUTCH PLATE
Filed Sept. 21, 1936　　　4 Sheets-Sheet 1
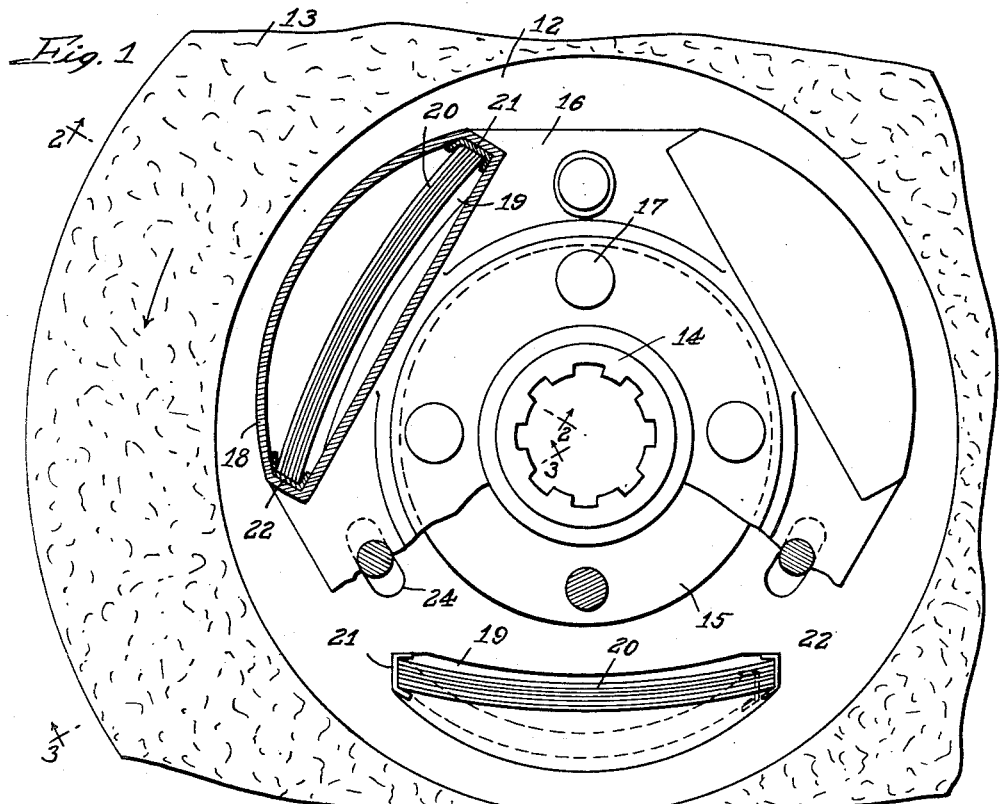
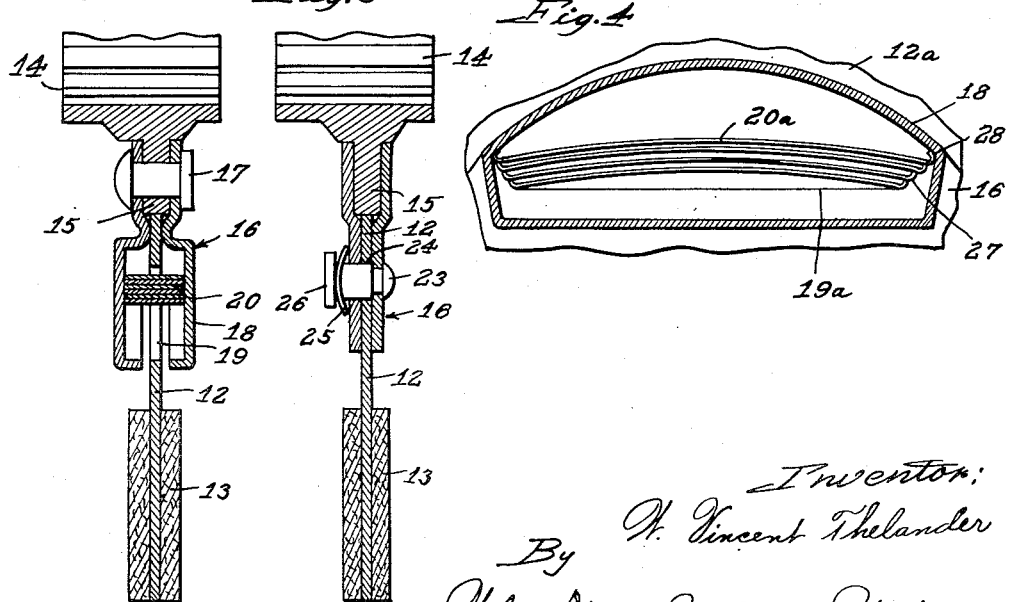
Inventor:
W. Vincent Thelander Jan. 10, 1939.  W. V. THELANDER  2,143,040
CLUTCH PLATE
Filed Sept. 21, 1936  4 Sheets-Sheet 3
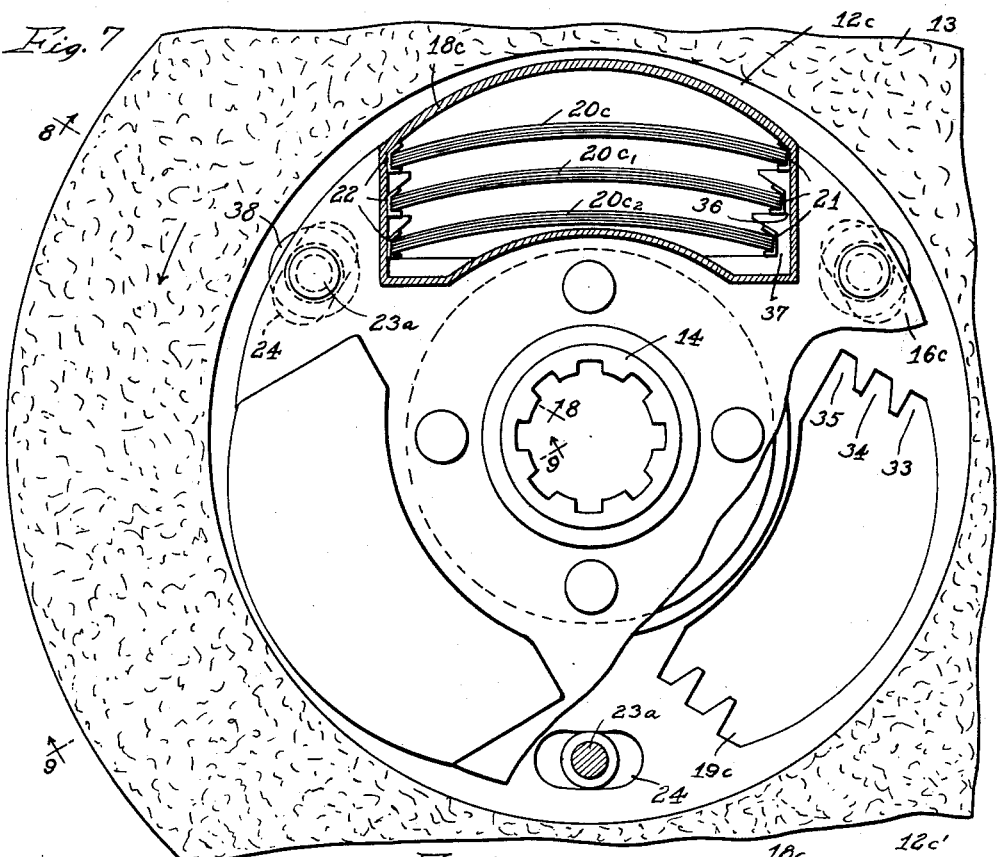
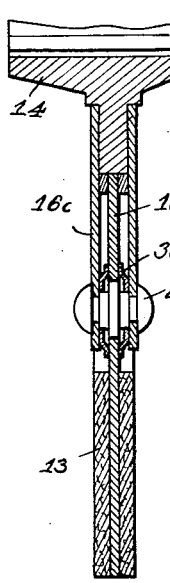
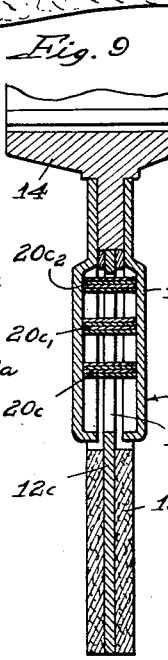
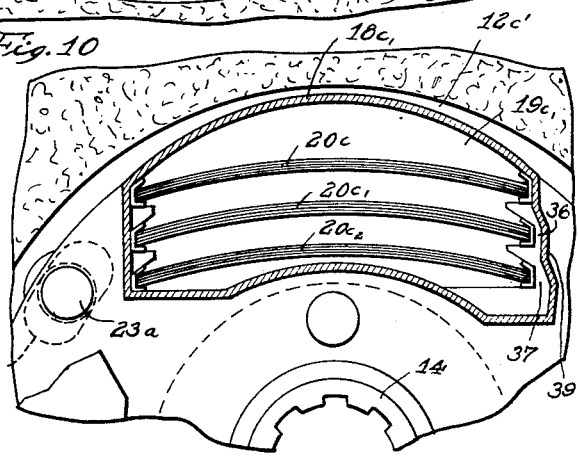
Inventor:
W. Vincent Thelander
By Wilson, Dowell, McCanna & Kintearon
Attys.

Jan. 10, 1939.　　　W. V. THELANDER　　　2,143,040
CLUTCH PLATE
Filed Sept. 21, 1936　　　4 Sheets-Sheet 4
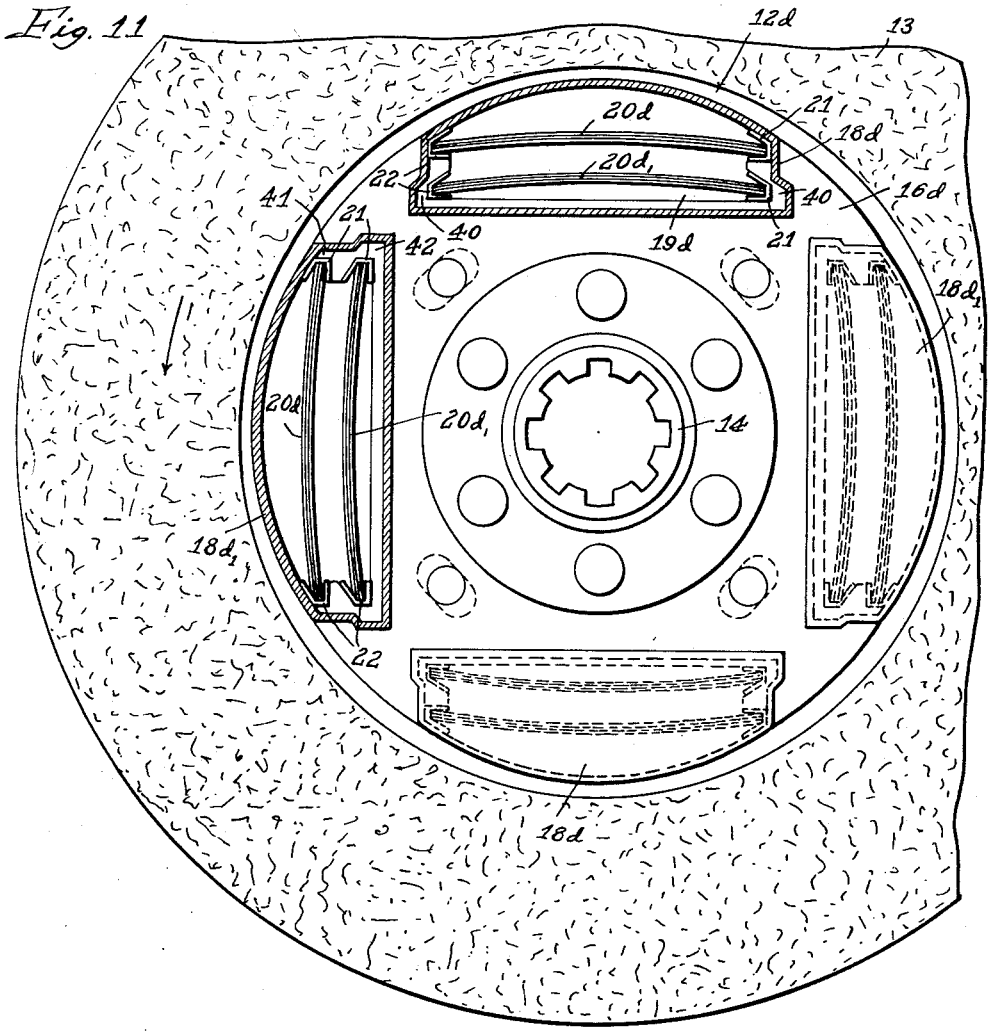

Patented Jan. 10, 1939

2,143,040

UNITED STATES PATENT OFFICE 2,143,040

CLUTCH PLATE

W. Vincent Thelander, Rockford, Ill.

Application September 21, 1936, Serial No. 101,685

29 Claims. (Cl. 192—68)

This invention relates to clutches for motor vehicles, and has particular reference to a torsionally cushioned clutch plate to dampen out vibrations otherwise transmitted to the body of the car and arising usually at the rear end of the transmission train.

Coiled compression springs have been used as the cushioning elements in clutch plates, because they possess the desired loading characteristics. However, they are expensive and moreover do not permit the desired compactness in construction. It is, therefore, the principal object of my invention to provide a clutch plate using leaf springs for transmitting the driving torque and also for cushioning, the leaf springs being incorporated in such a way as to give substantially the same operating characteristics as coiled springs. In the furtherance of this object I have arranged the leaf springs so that they assume the direct drive thrust and are flexed in predetermined sequence to build up the loading in such a way that the loading curve for coiled compression springs is very nearly approximated.

In a cushioned driven member of this kind, it is advantageous to have two characteristics in the cushioning means, one for driving and another for coasting, because when the clutch is transmitting engine torque, a stronger or stiffer spring reaction is required than when the engine is simply acting as a brake while the vehicle is coasting. It is, therefore, another important object of my invention to provide a clutch plate having the spring means for cushioning the same arranged so as to give these different characteristics when torque is applied to the plate under reverse conditions, namely, from the periphery to the hub in driving and from the hub to the periphery in coasting.

Still another object of my invention consists in the assembling of the leaf-springs in stacks held in grouped relation in stirrups which in turn are housed on the clutch plate between sheet metal plates secured to the center hub, whereby to make for economy in construction and at the same time minimum weight, with most of the weight concentrated as near the axis of rotation as possible to minimize inertia effects.

The invention is illustrated in the accompanying drawings, in which—

Figure 1 is a rear view of a clutch plate made in accordance with my invention, the cushioning means being shown partly in section and partly in elevation to better illustrate the construction, and a part of the periphery of the plate being broken away to enable showing the construction on a larger scale;

Figs. 2 and 3 are cross-sections on the correspondingly numbered lines of Figure 1;

Fig. 4 is a fragmentary sectional view showing a different construction;

Fig. 7 is another view similar to Figure 1, showing still another construction employing three stacks of leaf-springs in each housing;

Figs. 8 and 9 are sections taken on the correspondingly numbered lines of Fig. 7;

Fig. 10 is a fragmentary sectional view showing another construction similar to that of Fig. 7, and Fig. 11 is still another view similar to Figure 1, showing a still further construction somewhat similar to Figs. 5, 6 and 7.

Similar reference numerals are applied to corresponding parts throughout the views.

Figure 5:
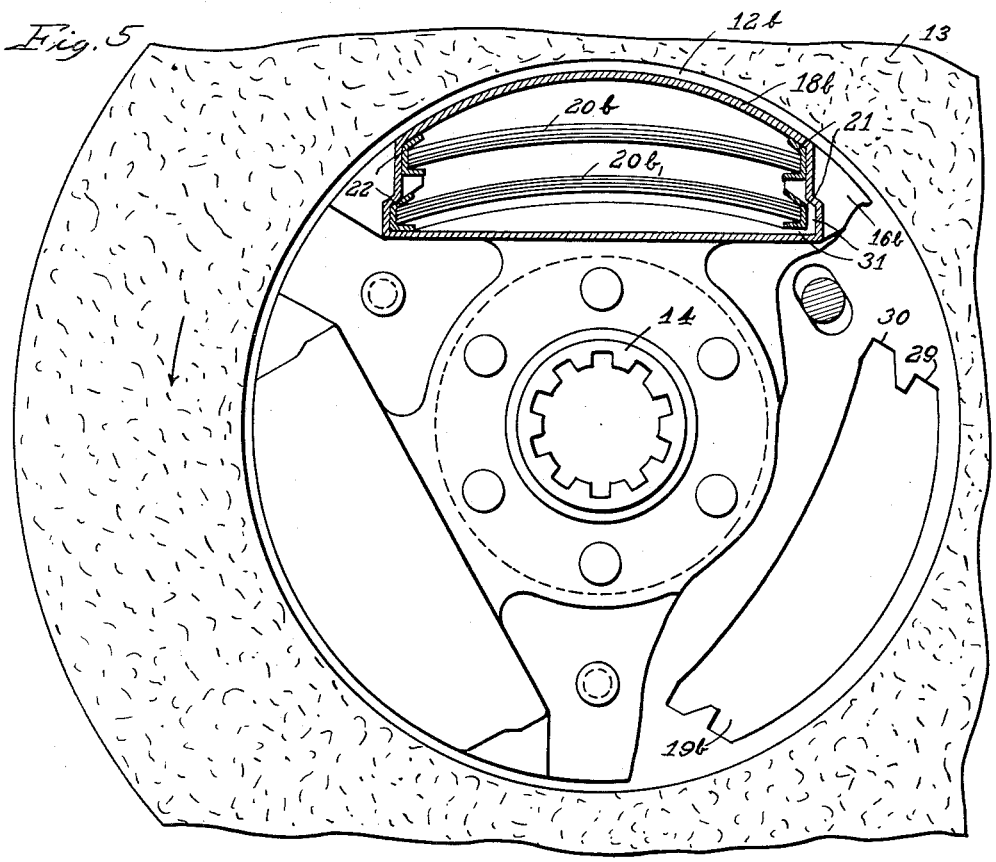
Fig. 5 is a view similar to Figure 1, showing another construction using two stacks of leaf-springs in each housing.

Referring first to Figures 1–3, the clutch disk 12 may be of any usual or preferred form insofar as the construction of the peripheral portion thereof is concerned where the facings 13 are mounted. The center hub 14 is splined for driving connection with the driving shaft of the transmission and has an annular flange 15 onto the opposite sides of which are fastened plates 16 by means of rivets 17. The plates 16 are formed to provide a plurality of circumferentially spaced housings 18 in registration with openings 19 provided in the disk 12, and in each of these housings is disposed a stack of leaf-springs 20. These are wide enough in relation to the thickness of disk 12 so that they project from both sides of the disk, as shown in Fig. 2, and the ends provide protruding thrust shoulders on opposite sides of the disk. The housing portions 18 of the plates 16 have their side walls in close proximity to the leaf springs 20, as also appears in Fig. 2, thus preventing lateral displacement thereof from the openings 19, while the end walls of the housings 18 cooperate with the ends of the springs, at the protruding thrust shoulders, to transmit the drive through said springs. The springs are placed under an initial tension, as indicated by the flexure thereof in Figure 1, and the ends are engaged in channel-shaped stirrups 21 and 22 disposed in transverse relation to the disk 12 at opposite ends of the openings 19 and bearing in the opposite ends of the housings 18. The parts 21 and 22 are merely intermediate thrust transmitting parts between the springs and the plates 16 on the one hand and between the springs and disk 12 on the other. Rivets 23 are passed through the plates 16 and through elongated arcuate slots 24 in the disk 12 therebetween and have spring washers 25 assembled under the heads 26 on one end under a predetermined tension sufficient to impose a certain frictional drag upon the movement of the disk and plates relative to one another so that there will be no play between the parts and no opportunity for vibration and noise in the operation of the clutch plate. These rivets 23 are located midway between the housings 18, and the slots 24 provided therefor in the disk 12 are struck on arcs concentric with the hub 14 for obvious reasons.

In operation, the disk 12 when the clutch is engaged will be turned in a counterclockwise direction, as indicated by the arrow in Figure 1. As a result, since the disk 12 is to transmit torque to the hub 14 through the springs 20 and plates 16, the stirrups 21 will be moved in a counterclockwise direction with the plate, whereas, the stirrups 22 will bear against the ends of the housings 18 and be spaced from the ends of the openings 19 more or less depending upon the resistance to rotation of the hub 14. That is to say, the springs 20 will be flexed further, as indicated in dotted lines in the lower portion of Figure 1. This flexing of the springs cushions the power transmission and makes for smoother operation of the car, but what is more important, these springs constitute cushioning elements in the power transmission train, which dampen out the vibrations otherwise transmitted to the body of the car and arising usually at the rear end of the transmission train, but apt to arise at other points either in front of or behind the clutch. The flexing of the leaf-springs 20 is positively limited by the engagement of the rivets 23 at the ends of the slots 24, the rivets being initially at a midpoint in these slots, as indicated in Figure 1. The cushioning action described is obtained not only when power is transmitted from the engine to the propeller shaft in the driving of the car but also when the car is coasting, under which conditions the drive is reversed and the hub 14 may be regarded as turning in a counterclockwise direction relative to the disk 12. Under those conditions, the stirrups 21 move in a counterclockwise direction with the housings 18, whereas, the stirrups 22 bear against the disk 12 at the ends of the openings 19 to transmit drive thereto, the stirrups 21 moving away from the ends of the openings 18 more or less depending upon the extent of braking action exerted by the engine. Here again, the springs 20 are flexed from their initial condition and the flexing is positively limited by the engagement of the rivets 23 with the other ends of the slots 24. It is apparent that even though the leaf-springs were to be broken, which is not very apt to happen, the clutch would not be thrown out of commission because the rivets 23 would still afford a driving connection between the disk 12 and plates 16. It is also apparent that the construction involves few parts, all of light and economical construction with the bulk of the weight disposed as close to the axis of rotation as possible so as to minimize inertia factors.

Fig. 4 illustrates a variation in which the disk 12a has openings 19a therein in register with the housings 18 on the plates 16, these openings being formed at the ends to provide steps or ledges 27 on which the curled ends 28 of the springs 20a are arranged to seat. With this construction the springs are all given an initial flexing similarly as in the previous construction but are "picked up" one by one in the relative movement between the plates 16 and disk 12a instead of all being flexed simultaneously. The bent ends 28 of the ledges provide broad shoulders for engagement with the ends of the housings 18 and with the ends of the openings 19a to assume the thrust in driving as well as coasting without excessive wear. Obviously, assuming there are three stacks of springs 20a, the present construction gives a "softer" cushioning action by reason of the fact that three springs are added to the spring cushioning load at a time instead of a multiple of that number simultaneously, the multiple being determined by the number of springs in each stack. Four are shown in Fig. 4 and six in Figure 1. This construction also offers the advantage of eliminating the stirrups 21—22 required in the construction of Figures 1–3 and the constructions of subsequent figures.

In Fig. 5, the disk 12b is similar to the disk 12 but the openings 19b therein have two sets of shoulders 29 and 30 instead of the one set illustrated in Figure 1 and the housings 18b on the plates 16b are correspondingly enlarged to register with these openings whereby to seat two stacks of leaf-springs in each housing, an outer stack 20b on the shoulders 29 and an inner stack 20b₁ on the shoulders 30. Stirrups 21 and 22 are provided at opposite ends of each housing as abutments for the ends of the two stacks of springs. It will be observed at 31 that the stirrup 21 at one end of the stack 20b₁ is in spaced relation to the adjacent end of the housing 18b. This is to allow a certain lag in the picking up of the stacks 20b₁ in coasting. If a similar clearance is provided at the other end, as at 32, in the disk 12b₁ in Fig. 6, it is obvious that this lag occurs both in driving and coasting. Accordingly, with the construction of Fig. 5, both stacks 20b and 20b₁ are effective simultaneously in driving, when the disk 12b turns in a counterclockwise direction with respect to the center hub 14, whereas, in coasting, when the center hub turns in a counterclockwise direction relative to the disk 12b first the outer stacks 20b are picked up and then the inner stacks 20b₁, thereby giving a softer cushioning effect. In other words, a stronger or stiffer spring reaction is provided when the clutch is engaged in pulling a load than when the engine is acting as a brake while the vehicle is coasting. The construction of Fig. 6, however, affords first a soft spring reaction and then a stiffer spring reaction both in driving and coasting. The torque transmitted through the springs in coasting is ordinarily much less than in driving and for that reason the construction of Fig. 5 will usually be preferred.

Referring now to Figs. 7, 8 and 9, the disk 12c has openings 19c having three set of shoulders 33, 34 and 35 registering with correspondingly enlarged housings 18c on the plates 16c. Each housing and opening contains three stacks of springs, the outermost stack 20c engaging the shoulders 33, the intermediate stack 20c₁ engaging the shoulders 34, and the inner stack 20c₂ engaging the shoulders 35. The stirrups 21 and 22 provided in connection with the springs are similar to those previously described and in this case due to the offsetting of the shoulders 34 and 35 inwardly in relation to the shoulder 33 at one end of the openings 19c, a clearance 36 is provided between the housing 18c and one end of the middle stacks 20c₁ and a greater clearance 37 is left between the end of the housings 18c and the corresponding end of the innermost stacks 20c₂ with the result that the innermost stacks will lag somewhat with relation to the middle stacks and they, in turn, will lag somewhat in relation to the outermost stacks. This, however, occurs only in coasting inasmuch as the other ends of the stacks are in direct engagement with the adjacent end of the housings 18c. With this construction, in coasting there is a three stage build-up as compared with the two stage build-up of Fig. 5. In other words, assuming the hub 14 is turning in a counterclockwise direction, the outermost stacks 20c are immediately effective to transmit torque from the plates 16c on the hub 14 to the disk 12c and when these springs have flexed to a certain extent the next springs 20c₁ are picked up and in turn are flexed, and finally the springs 20c₂ are picked up and flexed, thus giving a gradual build-up as compared with the more abrupt build-up previously described. A different form of rivet connection between the plates is shown in this plate, the rivets 23a being provided in connection with cupped spring washers 38 which are inserted between the disk 12c and the plates 16c in the manner shown in Fig. 8, whereby to exert frictional drag on both faces of the disk 12c.

The construction shown in Fig. 10 is similar to that of Fig. 7, but instead of having the offset relationship between the shoulders 33—35 at the ends of the openings 19c, the opening 19c₁ in the disk 12c₁ is made with the shoulders in alignment and the housings 18c₁ are formed at one end, as at 39, to provide the clearances 36 and 37 between the end of the housings and the adjacent ends of the stacks 20c₁ and 20c₂. The operation with this construction is obviously the same as with the previous construction and it offers the advantage of enabling the use of leaf-springs of uniform length.

Figure 6:
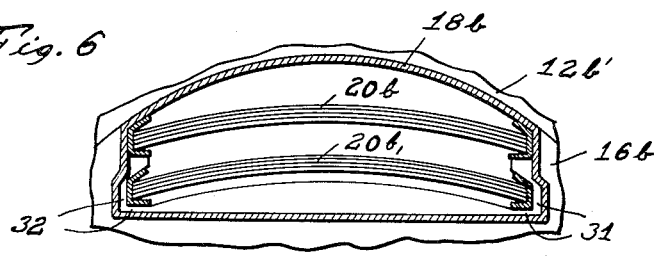
Fig. 6 is a fragmentary section of a housing similar to those shown in Fig. 5, but having a different arrangement of the inner stack of leaf-springs.

The disk 12d shown in Fig. 11 contains a construction somewhat related to that of Fig. 4, but more closely related to Figs. 5–7, particularly Fig. 6. Here there are two stacks of leaf-springs 20d and 20d₁ in each of the openings 19d in the plate. The housings 18d and 18d₁ on the plates 16d are not alike. The housings 18d are formed like the housing 18b of Fig. 6 to provide clearances 40 for the stirrups 21 and 22, respectively, of the stacks 20d₁ in relation to the adjacent ends of the housings. On the other hand, the housings 18d₁ are formed to provide clearances, as at 41 and 42, for the stirrups 21 and 22 of both stacks 20d and 20d₁, the clearances at 41 being less than clearances at 40 and the clearances at 42 being greater than the clearances at 40. This results in a four stage build-up both in driving and coasting, although, of course, it will be obvious that the build-up in driving may be eliminated or the build-up in coasting by simply omitting the clearances at one or the other end of the stacks. The operation is as follows: Assuming that the disk 12d is turned in a counterclockwise direction, the outermost springs 20d in the housings 18d assume the load first in transmitting drive from the disk 12d through the housings 18d and plates 16d to the hub 14. The slight flexing of these two stacks 20d is sufficient to take up the clearance at 41 for the stacks 20d in the housings 18d₁ so that those stacks are flexed next. After this second stage build-up, the clearance at 40 is taken up and the stacks 20d₁ in the housings 18d are picked up and flexed for the third stage. Finally, in the fourth stage the clearance at 42 is taken up and the stacks 20d₁ in the housings 18d₁ are flexed. The build-up in these four stages results in a curve very closely approximating a curve for a coiled compression spring and for that reason this form is preferred to any other which does not afford as gradual build-up. While I have shown the same clearances effective in the coasting, it will be obvious that different clearances may be provided if desired, as for example, greater clearances for the first stages of build-up to secure softer spring reaction in coasting than in driving.

In conclusion, it should be evident from the foregoing description that I have provided a clutch plate having a greatly increased range of cushioning ability. Thus, a period of vibration at low speed requiring a light cushioning effect to dampen it is taken care of, and also the periods of vibration at higher speeds. The graduated cushioning effect also provides lighter cushioning to dampen vibration incident to the engine acting as a brake, and heavier cushioning to dampen the vibration incident to the engine operating under load. This plate with its multi-stage cushioning, in other words, results in the dampening out of vibrations which a less adaptable clutch plate would transmit through it.

It is believed the foregoing description conveys a good understanding of the objects and advantages of my invention. The appended claims have been drawn with a view to covering all legitimate modifications and adaptations.

I claim:

1. In a clutch plate, a disk having friction drive surfaces on the marginal portion thereof, a hub in the center thereof, plates on opposite sides of said disk carried on the hub having housing portions provided thereon in register with openings provided in said disk, and torque transmitting leaf springs in said openings circumferentially arranged with respect to said disk and enclosed in said housings so as to have torque transmitted thereto at one end and transmit the same by end thrust at the other end, the leaf springs being the sole torque transmitting means, and, when under torque load, having one end engaging the adjacent end of the openings in the disk and the other end engaging the respectively opposite end of the housing portions on the plates.

2. In a clutch plate, a disk having friction drive surfaces on the marginal portion thereof, a hub in the center thereof, plates on opposite sides of said disk carried on the hub having housing portions provided thereon in register with openings provided in said disk, channel-shaped stirrups disposed in transverse relation to the disk and plates at opposite ends of said openings and housings, and torque transmitting leaf springs disposed circumferentially with respect to said disk in said openings with the ends thereof received in said stirrups, said leaf springs and stirrups being enclosed in said housings.

3. In a clutch plate, a disk having friction drive surfaces on the marginal portion thereof, a hub in the center thereof, plates on opposite sides of said disk carried on the hub having housing portions provided thereon in register with openings provided in said disk, and torque transmitting leaf springs inserted under initial flexure in said openings circumferentially arranged with respect to said disk and enclosed in said openings, the leaf springs being the sole torque transmitting means and said springs, with the clutch plate in a state of equilibrium, having engagement at both ends in the openings and in the housing portions, said springs when under torque load having one end engaging the adjacent end of the openings in the disk and the other end engaging the respectively opposite end of the housing portions on the plates.

4. In a clutch plate, a disk having friction drive surfaces on the marginal portion thereof, a hub in the center thereof, plates on opposite sides of said disk carried on the hub having housing portions provided thereon in register with openings provided in said disk, channel-shaped stirrups disposed in transverse relation to the disk and plates at opposite ends of said openings and housings, torque transmitting leaf springs disposed circumferentially with respect to said disk in said openings with the ends thereof received in said stirrups, said leaf springs and stirrups being enclosed in said housings, and means for positively limiting relative rotation between said disk and hub.

5. In a clutch plate, a disk having friction drive surfaces on the marginal portion thereof, a hub in the center thereof, plates on opposite sides of said disk carried on the hub having housing portions provided thereon in register with openings provided in said disk, channel-shaped stirrups disposed in transverse relation to the disk and plates at opposite ends of said openings and housings, torque transmitting leaf springs disposed circumferentially with respect to said disk in said openings with the ends thereof received in said stirrups, said leaf springs and stirrups being enclosed in said housings, and means passing through said plates and disk to impose friction resistance to relative rotation therebetween, said means constructed to also positively limit relative rotation between the disk and hub.

6. A clutch plate for friction clutches comprising a driving and a driven member, said members having a plurality of registering openings provided therein, and arched leaf springs circumferentially disposed relative to said plate in said openings and held at their ends against radial displacement by engagement with the ends of said openings and arranged to directly transmit torque yieldingly from the one member to the other by force exerted endwise thereof upon relative rotation between said members, all of said springs cooperating to transmit torque in either direction and said springs being the sole resilient torque transmitting means.

7. In a clutch plate, a friction drive disk, a hub in the center thereof, said disk having openings provided therein in circumferentially spaced relation around the hub, the openings being elongated circumferentially and providing opposed drive shoulders at opposite ends of each opening, a plurality of flexed leaf springs in stacked relation disposed lengthwise in each opening between said shoulders, said springs being of a width in relation to the thickness of said disk to provide protruding thrust shoulders on the ends thereof on opposite sides of the disk, and means turning with said hub arranged for engagement with said leaf springs on the sides to prevent lateral displacement thereof from said disk and arranged in driving relation to the thrust shoulders on the ends of said springs.

8. In a clutch plate, a friction drive disk, a hub in the center thereof, said disk having openings provided therein in circumferentially spaced relation around the hub, the openings being elongated circumferentially and providing opposed drive shoulders at opposite ends of each opening, a plurality of flexed leaf springs in stacked relation disposed lengthwise in each opening between said shoulders, said springs being of a width in relation to the thickness of said disk to provide protruding thrust shoulders on the ends thereof on opposite sides of the disk, means turning with said hub arranged for engagement with said leaf springs on the sides to prevent lateral displacement thereof from said disk and arranged in driving relation to the thrust shoulders on the ends of said springs, and means for positively limiting relative rotation between said disk and hub.

9. In a clutch plate, a friction drive disk, a hub in the center thereof, said disk having openings provided therein in circumferentially spaced relation around the hub, the openings being elongated circumferentially and providing opposed drive shoulders at opposite ends of each opening, a plurality of flexed leaf springs in stacked relation disposed lengthwise in each opening between said shoulders, said springs being of a width in relation to the thickness of said disk to provide protruding thrust shoulders on the ends thereof on opposite sides of the disk, said openings providing a second set of opposed drive shoulders at opposite ends thereof in radially spaced relation to the first mentioned shoulders, a second plurality of flexed leaf springs in stacked relation between said shoulders in each opening also providing protruding thrust shoulders on the ends thereof on opposite sides of the disk, and means turning with said hub arranged for engagement with said leaf springs on the sides to prevent lateral displacement thereof from said disk and arranged to assume driving relation first with one set of said springs and then the other.

10. In a clutch plate, a friction drive disk, a hub in the center thereof, said disk having openings provided therein in circumferentially spaced relation around the hub, the openings being elongated circumferentially and providing opposed drive shoulders at opposite ends of each opening, a plurality of flexed leaf springs in stacked relation disposed lengthwise in each opening between said shoulders, said springs being of a width in relation to the thickness of said disk to provide protruding thrust shoulders on the ends thereof on opposite sides of the disk, said openings providing a second set of opposed drive shoulders at opposite ends thereof in radially spaced relation to the first mentioned shoulders, a second plurality of flexed leaf springs in stacked relation between said shoulders in each opening also providing protruding thrust shoulders on the ends thereof on opposite sides of the disk, means turning with said hub arranged for engagement with said leaf springs on the sides to prevent lateral displacement thereof from said disk and arranged to assume driving relation first with one set of said springs and then the other, and means for positively limiting relative rotation between said disk and hub.

11. In a clutch plate, a friction drive disk, a hub in the center thereof, said disk having openings provided therein in circumferentially spaced relation around the hub, the openings being elongated circumferentially and providing opposed drive shoulders at opposite ends of each opening, a plurality of flexed leaf springs in stacked relation disposed lengthwise in each opening between said shoulders, said springs being of a width in relation to the thickness of said disk to provide protruding trust shoulders on the ends thereof on opposite sides of the disk, said openings providing a second set of opposed drive shoulders at opposite ends thereof in radially spaced relation to the first mentioned shoulders, a second plurality of flexed leaf springs in stacked relation between said shoulders in each opening also providing protruding thrust shoulders on the ends thereof on opposite sides of the disk, said openings providing a third set of opposed drive shoulders at opposite ends thereof in radially spaced relation to the first and second mentioned shoulders, a third plurality of flexed leaf springs in stacked relation between said shoulders in each opening also providing protruding thrust shoulders on the ends thereof on opposite sides of the disk, and means turning with said hub arranged for engagement with said leaf springs on the sides to prevent lateral displacement thereof from said disk and arranged to assume driving relation with the sets of springs in a predetermined sequence.

12. In a clutch plate, a friction drive disk, a hub in the center thereof, said disk having openings provided therein in circumferentially spaced relation around the hub, the openings being elongated circumferentially and providing opposed drive shoulders at opposite ends of each opening, a plurality of flexed leaf springs in stacked relation disposed lengthwise in each opening between said shoulders, said springs being of a width in relation to the thickness of said disk to provide protruding thrust shoulders on the ends thereof on opposite sides of the disk, said openings providing a second set of opposed drive shoulders at opposite ends thereof in radially spaced relation to the first mentioned shoulders, a second plurality of flexed leaf springs in stacked relation between said shoulders in each opening also providing protruding thrust shoulders on the ends thereof on opposite sides of the disk, said openings providing a third set of opposed drive shoulders at opposite ends thereof in radially spaced relation to the first and second mentioned shoulders, a third plurality of flexed leaf springs in stacked relation between said shoulders in each opening also providing protruding thrust shoulders on the ends thereof on opposite sides of the disk, means turning with said hub arranged for engagement with said leaf springs on the sides to prevent lateral displacement thereof from said disk and arranged to assume driving relation with the sets of springs in a predetermined sequence, and means for positively limiting relative rotation between said disk and hub.

13. A clutch plate for friction clutches comprising a driving and a driven member, said members having a plurality of registering openings provided therein, and arched leaf springs circumferentially disposed relative to said members in said openings and arranged to directly transmit torque yieldingly from the one member to the other by force exerted endwise thereof upon relative rotation between said members, said springs being in a plurality of stacks with the individual leaves of each stack arranged to be flexed in sequence in the progressive relative rotation between said driving and driven members.

14. A clutch plate for friction clutches comprising a driving and a driven member, said members having a plurality of registering openings provided therein, and arched leaf springs circumferentially disposed relative to said members in said openings and arranged to directly transmit torque yieldingly from the one member to the other by force exerted endwise thereof upon relative rotation between said members, said springs being disposed in a plurality of stacks and so disposed relative to the driving and driven members as to have the stacks flexed in a certain sequence in the progressive relative rotation between said members.

15. In a clutch plate, a friction drive disk, a hub in the center thereof, said disk having openings provided therein in circumferentially spaced relation around the hub, the openings being elongated circumferentially and providing opposed drive shoulders at opposite ends of each opening, a plurality of flexed leaf springs in stacked relation disposed lengthwise in each opening between said shoulders, said spring being of a width in relation to the thickness of said disk to provide protruding thrust shoulders on the ends thereof on opposite sides of the disk, said openings providing a second set of opposed drive shoulders at opposite ends thereof in radially spaced relation to the first mentioned shoulders, a second plurality of flexed leaf springs in stacked relation between said shoulders in each opening also providing protruding thrust shoulders on the ends thereof on opposite sides of the disk, there being four equally circumferentially spaced openings and the outer stacks of springs in diametrically opposed openings being arranged to be flexed simultaneously and likewise the inner stacks, and means turning with said hub arranged for engagement with said leaf springs on the sides to prevent lateral displacement thereof from said disk and arranged to assume driving relation, first with one related diametrically opposed pair of said inner and outer stacks and then with another diametrically opposed pair, and so forth, until all of said stacks are flexed.

16. In a clutch plate, a disk having friction drive surfaces on the marginal portion thereof, a hub in the center thereof rotatable with respect to the disk, and a plurality of circumferentially spaced torque transmitting leaf springs circumferentially disposed with respect to said disk and hub and so related operatively to the hub and disk as to provide a resilient driving connection therebetween, the torque throughout a predetermined range being transmitted between said hub and disk elements solely through said leaf springs by end thrust on all of said springs flexing the same.

17. In a clutch plate, a disk having friction drive surfaces on the marginal portion thereof, a hub in the center thereof rotatable with respect to the disk, and a plurality of circumferentially spaced torque transmitting leaf springs circumferentially disposed with respect to said disk and hub and so related operatively to the hub and disk as to provide a resilient driving connection therebetween, the springs being flexed under torque load by end thrust thereon in a predetermined sequence until all of said springs are flexed under end thrust, so as to build up the loading so that the loading curve approximates the loading curve for coiled compression springs when similarly utilized.

18. In a clutch plate, a disk having friction drive surfaces on the marginal portion thereof, a hub in the center thereof rotatable with respect to the disk, and a plurality of circumferentially spaced torque transmitting leaf springs circumferentially disposed with respect to said disk and hub and so related operatively to the hub and disk as to provide a resilient driving connection therebetween by end thrust on all of said springs flexing the same in the transmission of torque in either direction, the said springs being so related to the disk and hub in regard to loading, whereby a stiffer spring reaction is obtained in one direction of relative rotation between the hub and disk, suitable for drive transmitting purposes, and a weaker spring reaction is obtained in the opposite direction of relative rotation between the disk and hub, suitable for coasting.

19. In a clutch plate, a disk having friction drive surfaces on the marginal portion thereof, a hub in the center thereof rotatable with respect to the disk, and a plurality of circumferentially spaced stacks of torque transmitting leaf springs circumferentially disposed with respect to said disk and hub and so related operatively to the hub and disk as to provide a resilient driving connection therebetween, the stacks of springs being flexed under torque load by end thrust thereon in a predetermined sequence until all of the leaf springs are flexed under end thrust, so as to build up the loading so that the loading curve approximates the loading curve for coiled compression springs when similarly utilized.

20. In a clutch plate, a disk having friction drive surfaces on the marginal portion thereof, a hub in the center thereof rotatable with respect to the disk, and a plurality of circumferentially spaced stacks of torque transmitting leaf springs circumferentially disposed with respect to said disk and hub and so related operatively to the hub and disk as to provide a resilient driving connection therebetween, the individual leaf springs in the stacks being flexed under torque load by end thrust thereon in a predetermined sequence until all of the leaf springs are flexed under end thrust, so as to build up the loading so that the loading curve approximates the loading curve for coiled compression springs when similarly utilized.

21. In a clutch plate, a disk having friction drive surfaces on the marginal portion thereof, a hub in the center thereof rotatable with respect to the disk, and groups of circumferentially spaced stacks of torque transmitting leaf springs circumferentially disposed with respect to said disk and hub and so related operatively to the hub and disk as to provide a resilient driving connection therebetween, the stacks of springs being flexed under torque load by end thrust thereon in a predetermined sequence until all of the leaf springs are flexed under end thrust, so as to build up the loading so that the loading curve approximates the loading curve for coiled compression springs when similarly utilized.

22. In a clutch plate, a disk having friction drive surfaces on the marginal portion thereof, a hub in the center thereof rotatable with respect to the disk, and a plurality of circumferentially spaced stacks of torque transmitting leaf springs circumferentially disposed with respect to said disk and hub and so related operatively to the hub and disk as to provide a resilient driving connection therebetween by end thrust on all of said springs flexing the same in the transmission of torque in either direction, the said stacks of springs being so related to the disk and hub in regard to loading whereby a stiffer spring reaction is obtained in one direction of relative rotation between the hub and disk, suitable for drive transmitting purposes, and a weaker spring reaction is obtained in the opposite direction of relative rotation between the disk and hub, suitable for coasting.

23. In a clutch plate, a disk having friction drive surfaces on the marginal portion thereof, a hub in the center thereof rotatable with respect to the disk, and a plurality of circumferentially spaced stacks of torque transmitting leaf springs circumferentially disposed with respect to said disk and hub and so related operatively to the hub and disk as to provide a resilient driving connection therebetween by end thrust on all of said springs flexing the same in the transmission of torque in either direction, the individual springs in the stacks of springs being arranged to be loaded in a predetermined sequence to build up the loading in the progressive relative rotation between the hub and disk in either direction, the said stacks of springs being so related to the disk and hub in regard to loading, whereby a stiffer spring reaction is obtained in one direction of relative rotation between the hub and disk, suitable for drive transmitting purposes, and a weaker spring reaction is obtained in the opposite direction of relative rotation between the disk and hub, suitable for coasting.

24. In a clutch plate, a disk having friction drive surfaces on the marginal portion thereof, a hub in the center thereof rotatable with respect to the disk, and groups of circumferentially spaced stacks of torque transmitting leaf springs circumferentially disposed with respect to said disk and hub and so related operatively to the hub and disk as to provide a resilient driving connection therebetween by end thrust on all of said springs flexing the same in the transmission of torque in either direction, the said stacks of springs being so related to the disk and hub in regard to loading, whereby a stiffer spring reaction is obtained in one direction of relative rotation between the hub and disk, suitable for drive transmitting purposes, and a weaker spring reaction is obtained in the opposite direction of relative rotation between the disk and hub, suitable for coasting.

25. In a clutch plate, a friction drive disk, a hub in the center thereof, said disk having openings provided therein in circumferentially spaced relation around the hub, the openings being elongated circumferentially and providing opposed drive shoulders at opposite ends of each opening, at least one leaf spring disposed lengthwise in each opening between said shoulders, said springs being of a width in relation to the thickness of said disk to provide protruding thrust shoulders on the ends thereof on opposite sides of the disk, and means turning with said hub arranged for engagement with said leaf springs on the sides to prevent lateral displacement thereof from said disk and arranged in driving relation to the thrust shoulders on the ends of said springs.

26. In a clutch plate, a friction drive disk, a hub in the center thereof, said disk having openings provided therein in circumferentially spaced relation around the hub, the openings being elongated circumferentially and providing opposed drive shoulders at opposite ends of each opening, at least one leaf spring disposed lengthwise in each opening between said shoulders, said springs being of a width in relation to the thickness of said disk to provide protruding thrust shoulders on the ends thereof on opposite sides of the disk, means turning with said hub arranged for engagement with said leaf springs on the sides to prevent lateral displacement thereof from said disk and arranged in driving relation to the thrust shoulders on the ends of said springs, and means for positively limiting relative rotation between said disk and hub.

27. In a clutch plate, a friction drive disk, a hub in the center thereof, said disk having openings provided therein in circumferentially spaced relation around the hub, the openings being elongated circumferentially and providing opposed drive shoulders at opposite ends of each opening, at least one flexed leaf spring disposed lengthwise in each opening between said shoulders, said springs being of a width in relation to the thickness of said disk to provide protruding thrust shoulders on the ends thereof on opposite sides of the disk, said openings providing a second set of opposed drive shoulders at opposite ends thereof in radially spaced relation to the first mentioned shoulders, at least one other flexed leaf spring between the second set of shoulders in each opening also providing protruding thrust shoulders on the ends thereof on opposite sides of the disk, and means turning with said hub arranged for engagement with said leaf springs on the sides to prevent lateral displacement thereof from said disk and arranged to assume driving relation first with one set of said springs and then the other.

28. In a clutch plate, a friction drive disk, a hub in the center thereof, said disk having openings provided therein in circumferentially spaced relation around the hub, the openings being elongated circumferentially and providing opposed drive shoulders at opposite ends of each opening, at least one flexed leaf spring disposed lengthwise in each opening between said shoulders, said springs being of a width in relation to the thickness of said disk to provide protruding thrust shoulders on the ends thereof on opposite sides of the disk, said openings providing a second set of opposed drive shoulders at opposite ends thereof in radially spaced relation to the first mentioned shoulders, at least one other flexed leaf spring between the second set of shoulders in each opening also providing protruding thrust shoulders on the ends thereof on opposite sides of the disk, said openings providing a third set of opposed drive shoulders at opposite ends thereof in radially spaced relation to the first and second shoulders, at least one other flexed leaf spring between the third set of shoulders in each opening also providing protruding thrust shoulders on the ends thereof on opposite sides of the disk, and means turning with said hub arranged for engagement with said leaf springs on the sides to prevent lateral displacement thereof from said disk and arranged to assume driving relation with the sets of springs in a predetermined sequence.

29. In a clutch plate, a friction drive disk, a hub in the center thereof, said disk having openings provided therein in circumferentially spaced relation around the hub, the openings being elongated circumferentially and providing opposed drive shoulders at opposite ends of each opening, at least one flexed leaf spring disposed lengthwise in each opening between said shoulders, said springs being of a width in relation to the thickness of said disk to provide protruding thrust shoulders on the ends thereof on opposite sides of the disk, said openings providing a second set of opposed drive shoulders at opposite ends thereof in radially spaced relation to the first mentioned shoulders, at least one other flexed leaf spring between the second set of shoulders in each opening also providing protruding thrust shoulders on the ends thereof on opposite sides of the disk, there being four equally circumferentially spaced openings and the outer springs in diametrically opposed openings being arranged to be flexed simultaneously and likewise the inner springs, and means turning with said hub arranged for engagement with said leaf springs on the sides to prevent lateral displacement thereof from said disk and arranged to assume driving relation, first with one related diametrically opposed pair of said inner and outer springs and then with another diametrically opposed pair, and so forth, until all of said springs are flexed.

W. VINCENT THELANDER.